(12) United States Patent
Debaillie (10) Patent No.: US 8,711,904 B2
(45) Date of Patent: Apr. 29, 2014

(54) CALIBRATION METHOD FOR NON-IDEAL TRANSCEIVERS

(75) Inventor: Björn Debaillie, Westende (BE)

(73) Assignees: IMEC, Leuven (BE); Samsung Electronics Co., Ltd., Gyeonggi-do (KR)

( * ) Notice: Subject to any disclaimer, the term of this patent is extended or adjusted under 35 U.S.C. 154(b) by 534 days.

(21) Appl. No.: 12/563,070

(22) Filed: Sep. 18, 2009

(65) Prior Publication Data

US 2010/0128764 A1 May 27, 2010

Related U.S. Application Data

(63) Continuation of application No. PCT/EP2008/053366, filed on Mar. 20, 2008.

(60) Provisional application No. 60/920,511, filed on Mar. 28, 2007.

(30) Foreign Application Priority Data

May 18, 2007 (EP) .................................. 07108463

(51) Int. Cl.
*H04B 1/38* (2006.01)
(52) U.S. Cl.
USPC ............ 375/219; 375/296; 375/261; 375/235
(58) Field of Classification Search
CPC ......... H04B 1/38; H04B 1/034; H04B 1/3827
USPC ...................................................... 375/219
See application file for complete search history.

(56) References Cited

U.S. PATENT DOCUMENTS 6,009,317 A * 12/1999 Wynn ........................... 455/296
6,670,900 B1 12/2003 Zhang
(Continued)

FOREIGN PATENT DOCUMENTS

DE 10 2004 005130 B3 4/2005
EP 0378719 A1 7/1990
WO WO 03/101064 A1 12/2003

OTHER PUBLICATIONS

Brotje, et al., Estimation and Correction of transmitter-caused I/Q Imbalance in OFDM Systems, International OFDM Workshop, Sep. 10, 2002.

(Continued)

*Primary Examiner* — Lihong Yu
(74) *Attorney, Agent, or Firm* — Knobbe Martens Olson & Bear LLP (57) ABSTRACT

A method of determining non-ideality characteristics introduced on a signal by a transceiver is disclosed. The transceiver has an up-conversion transmitter and a down-conversion receiver. In one aspect, the method includes: a) generating a signal comprising at least one known training symbol, b) up-converting this signal with a first frequency to a first signal in the transmitter, c) transferring the first signal from the transmitter to the receiver, d) down-converting with a second frequency this transferred first signal to a second signal in the receiver, the second frequency being different from but linked to the first frequency, e) detecting at least one of the training symbols in the second signal; and f) separating, in the frequency domain, at least one of the components of at least one of the detected training symbols for determining the non-ideality characteristics.

25 Claims, 5 Drawing Sheets

(56) References Cited

U.S. PATENT DOCUMENTS

| | | | |
|---|---|---|---|
| 7,274,757 | B1 | 9/2007 | Zhou et al. |
| 7,408,976 | B1 | 8/2008 | Narasimhan et al. |
| 7,555,051 | B2* | 6/2009 | Zhang .......................... 375/261 |
| 7,606,316 | B1* | 10/2009 | Narasimhan .................. 375/260 |
| 2003/0144969 | A1* | 7/2003 | Coyne .......................... 705/400 |
| 2004/0165678 | A1 | 8/2004 | Nadiri |
| 2005/0069050 | A1* | 3/2005 | Ding et al. .................... 375/296 |
| 2005/0276354 | A1 | 12/2005 | Su et al. |
| 2006/0034356 | A1 | 2/2006 | Fechtel |
| 2007/0009011 | A1* | 1/2007 | Coulson ........................ 375/144 |
| 2007/0070691 | A1 | 3/2007 | Walvis et al. |
| 2009/0175362 | A1 | 7/2009 | Priotti |

OTHER PUBLICATIONS

International Search Report dated Jun. 2, 2008 for PCT/EP2008/053366.

International Preliminary Report on Patentability and Written Opinion dated Sep. 29, 2009 for PCT/EP2008/053366.

De Rore S. et al., "Joint estimation of carrier frequency offset and IQ imbalance for 4G mobile wireless systems", *Communications, 2006 IEEE International Conference on*, vol. 5, pp. 2066-2071, Jun. 2006.

Feng Yan et al., "Carrier Frequency Offset Estimation for OFDM Systems with I/Q Imbalance", *Proc. the 47th IEEE Int. Midwest Symposium on Circuits and Systems, MWSCAS '04*, vol. 2, pp. 633-636, Jul. 2004.

Feng Yan et al., "Carrier Frequency Offset Estimation and I/Q Imbalance Compensation for OFDM Systems" *EURASIP J. Advances in Signal Processing*, vol. 2007, No. 45364, Jan. 11, 2007.

S. Fouladifard and H. Shafiee, "Frequency offset estimation in OFDM systems in the presence of IQ imbalance," Proc. International Conference Communications, vol. 3, pp. 4280-4285, May 2003.

Funada et al., "A design of single carrier based PHY for IEEE 802.15.3c standard" *Proceedings of the IEEE International Symposium on Personal, Indoor and Mobile Radio Communications (PIMRC)* Sep. 3, 2007, Athens, Greece.

Guanbin Xing, Manyuan Shen, and Hui Liu, "Frequency offset and I/Q imbalance compensation for direct-conversion receivers," IEEE Transactions on Wireless Communications, vol. 4, pp. 673-680, Mar. 2005.

J. Tubbax, B. Come, L. Van Der Perre, S. Donnay, M. Engels, M. Moonen, and H. De Man, "Joint compensation of IQ imbalance and frequency offset in OFDM systems," Proc. of the IEEE Radio and Wireless Conference, pp. 39-42, Aug. 2003.

M.J.E. Golay, "Complementary series," *IEEE Transactions on Information Theory*, vol. 7, pp. 82-87, Apr. 1961.

Suh et al., "Preamble design for Channel Estimation in MIMO-OFDM Systems," IEEE, 2003, pp. 317-321, vol. 1, Suwon, South Korea.

T.M. Schmidl and P.Cox, "Robust frequency and timing synchronization for OFDM", *IEEE Transactions on Communications*, vol. 45, pp. 1613-1621, Dec. 1997.

TG3c Channel Modeling Sub-committee Final Report, *Doc. IEEE 15-07-0584-01-003c*, Mar. 13, 2007.

IEEE Standard 802.15.3c, Wireless Medium AccessControl (MAC) and Physical Layer (PHY) Specifications for High Rate Wireless Personal Area Networks (WPANs), IEEE Computer Society, 2009, available from http://ieeexplore.ieee.org/xpl/freeabs_all.jsp?reload=true&tp=&isnumber=5284443&arnumber=5284444&punumber=5284442&tag=1.

International Search Report dated Jun. 12, 2009, issued in International Application No. PCT/EP2008/064802.

* cited by examiner

CALIBRATION METHOD FOR NON-IDEAL TRANSCEIVERS

CROSS REFERENCE TO RELATED APPLICATIONS

This application is a continuation of PCT Application No. PCT/EP2008/053366, filed Mar. 20, 2008, which claims priority under 35 U.S.C. §119(e) to U.S. provisional patent application 60/920,511 filed on Mar. 28, 2007. Each of the above applications is incorporated herein by reference in its entirety.

BACKGROUND OF THE INVENTION

1. Field of the Invention

The present invention relates to a method to characterize and compensate transceiver non-idealities. The non-idealities may be transmitter and receiver quadrature imbalance, carrier feedthrough and dc-offset.

2. Description of the Related Technology

As transceiver design, especially multi-mode transceiver design, hardly meets required radio performances, numerous calibration methods have been proposed. Focusing on the digital calibration methods, they are all facing the same problem: how to generate and capture the RF signal efficiently. Most prior art methods solve this problem by increasing the circuit cost and complexity.

A method requiring a limited amount of additional circuitry is presented in US2006/0034356. A transmission/reception arrangement and a method are provided to reduce non-linearities in the output signal from a transmission/reception arrangement. When calibration is required, the transmission/reception arrangement disables normal operation and turns to calibration mode. This involves not only deactivation of the normal baseband signal processing but also connection between the transmission and reception paths. A test signal is produced and supplied to the arrangement. Optimization of the arrangement's characteristics is based on an approach which iteratively searches a minimum of the error signal power, e.g. LMS algorithm. A measuring apparatus evaluates the test signal and assesses the power of this error signal. If the power is below a certain threshold, the optimization is halted. Then, calibration is terminated and the normal operating mode is restored.

SUMMARY OF CERTAIN INVENTIVE ASPECTS

Certain inventive aspects relate to a calibration method for non-ideal transceivers, which characterizes its non-idealities such as quadrature imbalance, carrier feedthrough and dc-offset and optimizes its performance.

One inventive aspect relates to a method of determining non-ideality characteristics introduced on a signal by a transceiver. The transceiver comprises a first up-conversion transmitter and a first down-conversion receiver. The method of determining non-ideality characteristics comprises the process of generating a signal, which comprises at least one known training symbol. This signal is being up-converted with a first frequency to a first signal in the transmitter. This first signal is being transferred from the transmitter to the receiver by means of e.g. coupling. There could be an active coupling, but in one aspect it is preferred to exploit the parasitic coupling which is inherently present in the system, while in the prior art an amplified connection is needed between the transmission and reception paths to be able to transfer the test signal. The transferred first signal is being down-converted with a second frequency to a second signal in the receiver. The second frequency is different from but linked to the first frequency. From the second signal, at least one of the training symbols is detected, and, in the frequency domain, spectral component(s) of at least one of these detected training symbol(s) are separated for determining the non-ideality characteristics. Based on these spectral components, both the transmitter and receiver non-idealities can be characterized without the need for additional analog circuitry.

As used herein, "different but linked" means that the transmitter operates at a different frequency with respect to the receiver, but which is predeterminedly chosen such that separation of the spectral tones, as initiated earlier, is facilitated. To ensure stability of this frequency relation, these signals are e.g. generated from the same reference.

As used herein, the "non-idealities" under consideration can be one or more of the following: transmitter and receiver quadrature imbalance, carrier feedthrough, dc-offset, non-linearities or any other non-idealities known to the person skilled in the art.

The cited non-idealities generate (unwanted) spectral tones at specific frequencies. In normal operation, these tones will degrade the system performance. Different techniques have been published to calibrate these non-idealities. An analysis of these prior art techniques learns that these techniques mainly battle with the same problem: for transmitter and receiver calibration, how to, respectively, capture and generate the RF signal efficiently; where efficiently refers to limiting the extra analog circuitry while preserving all relevant signal information.

In one aspect, the transmitter is used to generate an RF signal for the receiver calibration, where the receiver is used to capture an RF signal required for transmitter calibration. This is achieved by transferring the signal generated by the transmitter to the receiver, for example via coupling.

In one aspect, transceiver non-idealities can be calibrated (characterized and compensated) without requiring additional analog circuitry. Therefore, the proposed method can be applied on any transceiver containing a given architecture allowing the transmitter and receiver to operate simultaneous on a (ev. slightly) different frequency. Furthermore, the calibration method characterizes and compensates the non-idealities of the transmitter and the receiver separately. Therefore, both transmitter and receiver can be used as separated calibrated devices in a global system topology.

Because the calibration operates on symbols which are present in standard compliant signals, dedicated (standard incompliant) calibration signals can be avoided. As a result, the calibration allows the system to remain operational during calibration. The calibration is furthermore time- and computation-efficient as it applies on at least one training symbol; iterative optimization loops can be avoided. The method allows thus the system to remain operational during calibration; dedicated (standard incompliant) calibration signals can be avoided.

The transceiver may comprise a plurality of transmitters and receivers. In this embodiment, the method further comprises of an initial process of selecting at least one transmitter/receiver pair. The selected transmitter/receiver pair then forms the first transmitter and the first receiver of the method according to one aspect.

A pair is formed by a transmitter and a receiver. Different types of combinations can be formed. A possible combination comprises different pairs in parallel; transmitter A with receiver A, transmitter B with receiver B and so on. An advantage of selecting a number of pairs in parallel is that the calibration duration can be minimized by performing several calibrations in parallel.

Another possible combination comprises pairs formed by one transmitter with a number of receivers; transmitter A with receiver A, transmitter A with receiver B and so on. By selecting such combination, a number of calibrations can be performed simultaneously, allowing a statistical interpretation of the calibration results. Further, a number of these combinations can be placed in parallel, combining both advantages.

The method of determining non-ideality characteristics is preferably performed at predetermined time instances, such as for example at start-up, at mode handover or at user-defined instances. As used herein, mode handover refers to the moment there is a change in operation mode or standard in multi-mode systems.

In one aspect, the method can be used to characterize transmitter quadrature imbalance characteristics. This can be done by comparing the separated components with the known training symbol. Taking the transmitter quadrature imbalance characteristics into account, the receiver quadrature imbalance characteristics can be determined. Again this is done by comparing the separated components with the known training symbol.

In another embodiment, carrier feedthrough characteristics can be determined by comparing the separated components with the known training symbol.

In another embodiment, the receiver dc-offset can be determined by applying a compensation dc.

In another aspect of the invention, a method of operating a transceiver is presented. The transceiver comprises at least one up-conversion transmitter and at least one down-conversion receiver. This method comprises digitally pre-compensating signals provided to the transmitter and digitally post-compensating signals coming from the receiver. The pre- and post-compensation method uses the characteristics which have been determined by means of the method according to the above-mentioned embodiments. Hence the effects introduced by the transceiver non-idealities can be minimized. The compensation is applied in the time-domain; therefore it is mode and data-stream independent.

The digital pre-compensation method comprises a first signal manipulation according to the transmitter quadrature imbalance characteristics, thereafter a second signal manipulation according to the carrier feedthrough characteristics.

The digital post-compensation method comprises a signal manipulation according to the receiver quadrature imbalance characteristics.

In another embodiment, the method of operating a transceiver further comprises selecting at predefined time instances a transmitter/receiver pair. The non-ideality characteristics of this pair can be characterized according to the method described above. This embodiment may further comprise pre- and post-compensating signals in the transmitter/receiver pair according to the calibrated characteristics. The method can be used in SISO, MIMO and other systems. The proposed calibration method allows scheduling such that the system remains operational. During mode-handover in e.g. MIMO systems, the system remains operational by gradually calibrating and switching the different transceivers to the new mode while keeping the remaining ones operational in the original mode.

Another inventive aspect relates to a system for determining transmitter and receiver non-ideality characteristics introduced on a signal by a transceiver. The transceiver comprises a first up-conversion transmitter and a first down-conversion receiver. The system comprises a generating unit configured to generate a signal comprising at least one known training symbol as part of a data package to be transmitted. The system further comprises a up-converting unit configured to up-convert with a first frequency the signal to a first signal in the first transmitter. The system further comprises a transferring unit configured to transfer the first signal from the first transmitter to the first receiver. The system further comprises a down-converting unit configured to down-convert with a second frequency the transferred first signal to a second signal in the first receiver, the second frequency being different from but linked to the first frequency. The system further comprises a detecting unit configured to detect at least one of the training symbols in the second signal. The system further comprises a separating unit configured to separate, in the frequency domain, at least one of the components of at least one of the detected training symbols for determining the non-ideality characteristics.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION OF CERTAIN ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

The following detailed description relates to a method for calibrating transceiver non-idealities. Such calibration relaxes the design requirements and therefore enables to reduce the design effort and design complexity. This relaxation is crucial for multi-mode transceivers as meeting all required radio performances overloads the design requirements.

In certain embodiments, the method calibrates (characterizes and compensates) transceiver non-idealities without requiring additional analog circuitry. Therefore, the proposed method can be applied on any transceiver containing a given architecture allowing the transmitter and receiver to operate simultaneously on a (ev. slightly) different frequency.

The calibration method characterizes and compensates the non-idealities of the transmitter and the receiver separately. Therefore, both transmitter and receiver can be used as separated calibrated devices in a global system topology.

The non-idealities under consideration are one or more of the following: transmitter and receiver quadrature imbalance, carrier feedthrough and dc-offset calibration. The method proposed also enables calibration of other non-idealities.

The calibration method can be used in SISO, MIMO and other systems.

Figure 1:
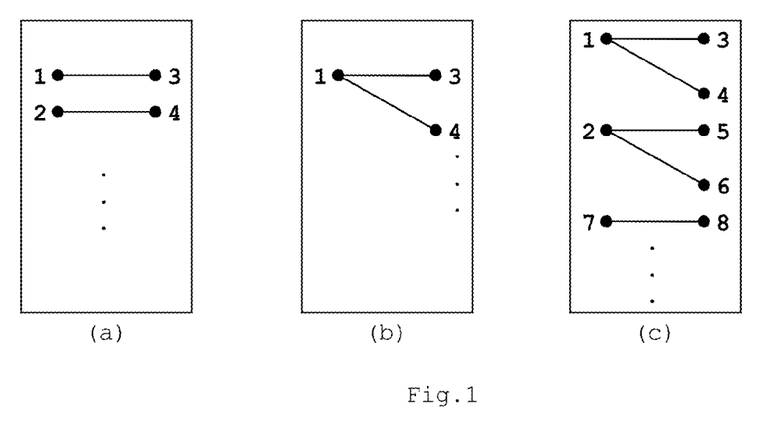
FIG. 1 shows schematic possible transmitter/receiver pair combinations.

The calibration method can be performed on a transceiver comprising a plurality of transmitters and receivers. The method then further comprises selecting at least one transmitter/receiver pair, whereby a pair is formed by one transmitter and one receiver. Different types of combinations of pairs can be formed. Some possible combinations are represented in FIG. 1. FIG. 1(a) shows a first possible combination. This combination comprises different pairs in parallel; a transmitter A (1) with a receiver A (3), a transmitter B (2) with a receiver B (4), . . . . For such a configuration, several calibrations can be performed in parallel. FIG. 1(b) shows another possible combination. This combination comprises pairs formed by the same transmitter with a number of receivers; a transmitter A (1) with a receiver A (3), a transmitter A (1) with a receiver B (4), . . . . A number these combinations can be placed in parallel (mixing both types of combinations). FIG. 1(c) shows such a configuration wherein a transmitter A (1) forms a pair with a receiver A (3) and another pair with a receiver B (4) and wherein another transmitter B (2) forms a pair with a receiver C (5) and with a receiver D (6) and wherein another transmitter C (7) forms a pair with a receiver E (8).

The characterization is preferably performed at pre-determined time instances, such as at start-up, at mode handover (in multi-mode systems) or at user-defined instances. The characterization allows the system to remain operational during calibration; dedicated (standard incompliant) calibration signals can be avoided.

The compensation is applied in the time-domain; therefore it is mode and data-stream independent.

The cited non-idealities generate (unwanted) spectral tones at specific frequencies. In normal operation, these tones will degrade the system performance. Different techniques have been published to calibrate these non-idealities. These techniques mainly battle with the same problem: for transmitter and receiver calibration, how to, respectively, capture and generate the RF signal efficiently; where efficiently refers to limiting the extra analog circuitry while preserving all relevant signal information.

In certain embodiments, the transmitter is used to generate an RF signal for the receiver calibration, where the receiver is used to capture an RF signal required for transmitter calibration. This is achieved by transferring the signal generated by the transmitter to the receiver, for example via coupling.

Figure 2:
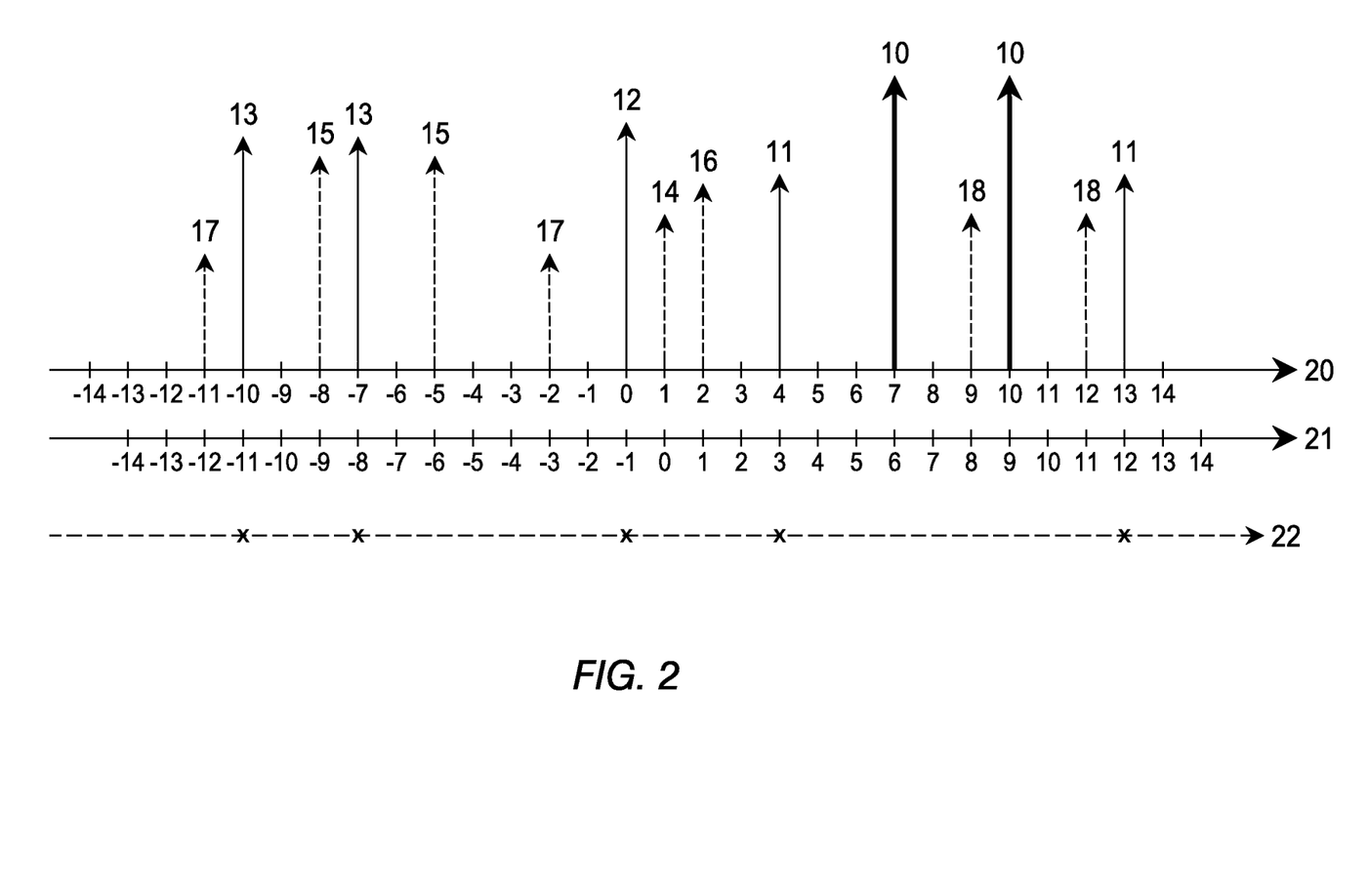
FIG. 2 shows the spectral content of a dual tone signal transmitted/received through a non-ideal transceiver.

The transmitter operates on a different frequency with respect to the receiver. This allows separation of the spectral tones caused by the transmitter and the receiver non-idealities. Note that different frequency combinations fulfilling this condition enable characterization of the frequency-dependency of transceiver non-idealities. An example is illustrated in FIG. 2 where a dual-tone signal (10) has propagated through a non-ideal transmitter, transferred to and down-converted with a non-ideal receiver. This action results in the following components: the $3^{rd}$ order inter-modulation product due to transmitter non-linearity (11), carrier feedthrough (12), the image of the wanted tone caused by transmitter quadrature imbalance (13), the dc-offset in the receiver path (14), the image of the wanted tone caused by receiver quadrature imbalance (15), the image—caused by receiver quadrature imbalance—of the carrier feedthrough (16), the image—caused by receiver quadrature imbalance—of the $3^{rd}$ order inter-modulation product (17) and the image—caused by receiver quadrature imbalance—of the imaged wanted tone (18). The components are plotted along axis (20) which represents the normalized transmitted spectral index, along axis (21) the received spectral index and along axis (22) indicating the components unaffected by the receiver non-idealities.

In the prior art the characterization of non-linearities is performed on a dedicated, standard incompliant, test signal. Further, the characteristics are optimized through an approach which iteratively searches a minimum of the error signal power. During this characterization, the transceiver is disabled for normal operation. In one embodiment, the characterization of transceiver non-idealities can be performed based on the training symbol of a standard compliant data package. Algorithmic expressions are provided for each of the calibration processes (in particular, characterization and compensation). These expressions offer high calibration accuracy; iterative loops can be avoided. As the characterization can be performed on the training symbol of a standard compliant data package, the transceiver remains operational.

Certain non-idealities will be described herein. However, the invention is not limited to these non-idealities. The calibration method enables calibration of a broad range of transceiver non-idealities.

The calibration method is illustrated for a direct conversion transceiver comprising a direct up-conversion transmitter and a direct down-conversion receiver. In this illustration, a selection of non-idealities is being calibrated. This selection comprises transmitter and receiver quadrature imbalance, carrier feedthrough and receiver dc-offset.

Towards this document, signals are underscored and scalars are not, time domain signals are denoted in lowercase font and the first letter of frequency domain signals are denoted in uppercase font. All signals and scalars are complex except if they are upperscored.

The idea of a direct conversion transmitter is to directly up-convert a complex-valued base-band signal to a real-valued RF signal by means of mixing with a local oscillator (LO) signal, while a direct conversion receiver directly down-converts an RF signal to a complex-valued base-band signal. The complex-valued base-band signals consists of a real (I) and an imaginary (Q) part and the LO signal consists two signals at the carrier frequency but 90° shifted in phase. In practical implementation however, slight mismatches between the I and Q path and gain mismatches and imperfect 90° phase shift between the LO paths will be present. Grouping these imperfections for the transmitter and receiver, it can be expressed as transmitter and receiver quadrature imbalance respectively. The quadrature imbalance is generally characterized by its amplitude mismatch c and its phase mismatch $\Delta\phi$, but for calculations, the complex-valued parameters $\alpha$ and $\beta$ will be used. When providing a time domain signal x to such quadrature imbalance, $$y = \alpha \cdot x + \beta \cdot x^* \quad (1)$$

with ( )* the complex conjugate and $$\alpha = \cos(\Delta\phi) + j \cdot \epsilon \sin(\Delta\phi) \quad (2)$$

$$\beta = \epsilon \cdot \cos(\Delta\phi) - j \cdot \sin(\Delta\phi) \quad (3)$$

Expression (1) can easily be transformed to the frequency domain such that $$Y = \alpha \cdot X + \beta \cdot X^*_m \quad (4)$$

where ( )$_m$ denotes the mirroring or imaging operation in which the vector indices are mirrored over dc such that $\bar{k}'=\mathrm{mod}(\bar{k}_{tot}-\bar{k}+1, \bar{k}_{tot})+1$, where $\bar{k}'$ denotes of the mirrored vector index of $\bar{k}$ and $\bar{k}_{tot}$ the total amount of indices.

Quadrature imbalance modifies thus the spectral content of X and causes spectral components at the image frequencies (mirrored indices) of its data-carriers. As in multi-carrier modulation the data-carriers are generally symmetrically spaced, quadrature imbalance will directly degrade the quality of each of the data-carriers and hence degrade system performance.

In direct conversion transmitters, direct cross-talk from the LO signal towards the RF signal path and parasitic dc-offsets in the base-band path cause an unwanted spectral component at the carrier frequency. The generation of this unwanted spectral tone, so-called carrier feedthrough, is generally standard-specified to be substantially smaller than the effective signal power. Meeting this requirement is practically difficult for standards offering a large output power range especially because the power of this unwanted carrier does not intrinsically scale with the gain of the transmitter.

In direct conversion receivers, parasitic coupling between the LO path and the RF path—in both directions—will cause self-mixing and creation of a dc-offset on the base-band signal. This dc-offset decreases the effective dynamic signal swing, especially when the received signal power is low, and therefore reduces the gain and linearity performances of the receiver. Using a high-pass filter to remove the dc-offset from the base-band signal is not an option: the targeted standards have a dense spectral occupation and such filters cannot be implemented efficiently. Therefore, another calibration technique is preferably used.

As any analog circuit, also the direct conversion transceiver can operate non-linear: unbalanced gain distribution over or insufficient dimensioning of the analog circuits might cause signals to exceed circuit's linear operation range. Such non-linear operation causes both harmonic and inter-modulation distortion, generating both in-band and out-of-band distortion. In literature, numerous models have been described to simulate and compensate for the non-linear behavior. Determining the parameters of these models, however, require advanced—thus implementation unfriendly—measurement equipment or circuitry.

For clarity, calibration will be split in two entities, namely characterization and compensation.

As illustrated in FIG. 2, spectral components exist that are unaffected by receiver non-idealities; indicated in (22). Such components also exist when applying other signals rather than the dual-tone. Therefore, an intuitive representation of the calibration enabling method is given in FIG. 3. A baseband signal s (23) in a transceiver (30) is up-converted (34) by a non-ideal transmitter (24) and coupled to the receiver input (25). The frequency response of this coupling, or channel, is described by CH (26). The receiver (33) down-converts (35) the signal, and based on spectral selection, two base-band signals are obtained; ri (27) indicating the received signal that is not affected by the receiver non-idealities and r (28) indicating the affected signal. Note that these signals are extracted from the same physical receiver, at the same time and from the same transmitted base-band signal.

Figure 3:
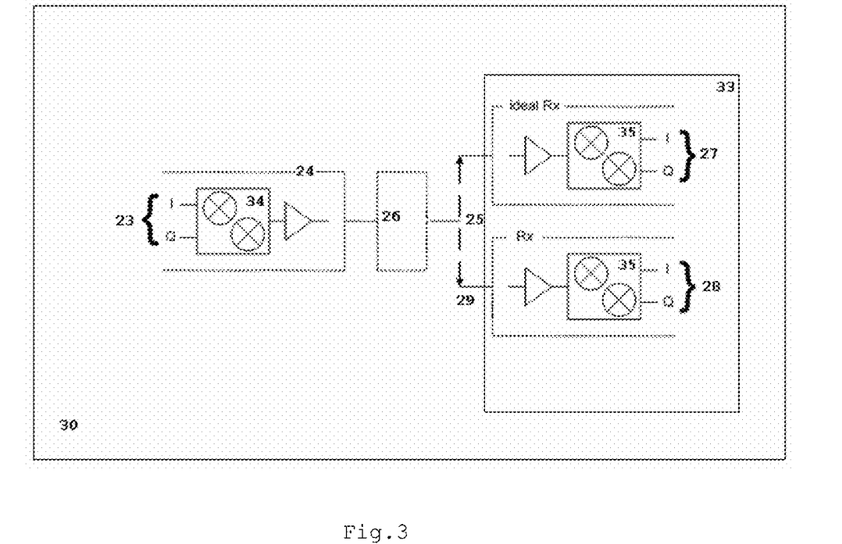
FIG. 3 represents schematic the calibration enabling method.

As a virtual ideal receiver path exist, the transmitter non-idealities are characterized based on s (23) and ri (27), while the receiver non-idealities are characterized from r (28).

During characterization, radiation of non-standard compliant signals is preferably avoided. Hence using a dedicated calibration signal (such as a dual tone (10) in FIG. 2) is not preferred. Also, an iterative characterization process blocking the transceiver operation is not favorable. Therefore, the characterization algorithms presented here have been developed to operate on one single standard-compliant training symbol, e.g. a long training symbol (LTS).

The transmitter quadrature imbalance characterization builds on the realistic assumption that the frequency response of the channel is flat or eventually smooth. Quadrature imbalance impacts the smoothness of the channel. By smoothing the channel, the quadrature imbalance is estimated as mentioned for the receiver quadrature imbalance characterization in WO03/101064, which is hereby incorporated by reference in its entirety. Based on FIG. 3 and considering quadrature imbalance as the only transmitter non-ideality, the signal at the output of the 'ideal receiver' Ri (27) is a function of the transmitted signal S (23), the transmitter quadrature imbalance and the effective channel CH (26) and equals:

$$Ri = (\alpha_{tx} \cdot S + \beta_{tx} \cdot S^*_m) \quad (5)$$

At the receiver side, the channel response H is estimated as:

$$H = \frac{Ri}{S} \quad (6)$$

if S is a BPSK symbol, then $$S = \frac{1}{S}$$

and $S' = S^*_m \cdot S = S_m \cdot S$, and therefore, $$H = \alpha_{tx} \cdot CH + \beta_{tx} \cdot S' \cdot CH \quad (7)$$

Based on (7), H depends on the quadrature imbalance of the transmitter. The effective channel response is derived as:

$$CH = \frac{H}{\alpha_{tx} + \beta_{tx} \cdot S'} \quad (8)$$

In this expression, the effective channel is related with the (known) transmitted signal S (23), the (known) estimated channel H and the quadrature imbalance introduced by the transmitter. Based on the behavior of the effective channel—flat or smooth—the quadrature imbalance can be estimated.

When assuming that the effective channel response is flat, it can be stated that:

$$\forall_{\bar{k}} \; CH = \frac{H[\bar{k}]}{\alpha_{tx} + \beta_{tx} \cdot S'[\bar{k}]} \quad (9)$$

where $\bar{k}$ and $\bar{k}+1$ are indices of non-zero data-carriers in S. For $\bar{n}$ of these indices, the following can be derived:

$$\beta_{tx} = \frac{\alpha_{tx}}{\bar{n}} \cdot \sum_{\bar{k}}^{\bar{n}} \frac{H[\bar{k}] - H[\bar{k}+1]}{H[\bar{k}+1] \cdot S'[\bar{k}] - H[\bar{k}] \cdot S'[\bar{k}+1]} \quad (10)$$

An increased value of $\bar{n}$ improves the estimation accuracy; the impact of eventual system noise is decreased and smooth—in stead of flat—channels are tolerated.

Approximating $\alpha_{tx} \approx 1$ leads to $$\tilde{\beta}_{tx} = \frac{1}{n} \cdot \sum_{\bar{k}}^{\bar{n}} \frac{H[\bar{k}] - H[\bar{k}+1]}{H[\bar{k}+1] \cdot S'[\bar{k}] - H[\bar{k}] \cdot S'[\bar{k}+1]} \quad (11)$$

$$\alpha_{tx} = \sqrt{1 - \mathcal{J}^2\{\tilde{\beta}_{tx}\}} - j\frac{\Re\{\tilde{\beta}_{tx}\} \cdot \mathcal{J}\{\tilde{\beta}_{tx}\}}{\sqrt{1 - \mathcal{J}^2\{\tilde{\beta}_{tx}\}}} \quad (12)$$

$$\beta_{tx} = \alpha_{tx} \cdot \tilde{\beta}_{tx} \quad (13)$$

Alternatively, the effective channel can be assumed to be smooth rather than, such as in the previous derivation, flat. Then, the variation of the effective channel variation can be approximated by minimizing the mean square error (MSE):

$$MSE = \sum_{k}^{K} |CH[k+1] - CH[k]|^2 \quad (14)$$

where $\bar{k}$ and $\bar{k}+1$ are indices of non-zero data-carriers in S. Based on (8), (14) equals:

$$MSE = \sum^{K} \left| \frac{\alpha \cdot H[k+1] - \alpha \cdot H[k] - \beta \cdot}{H[k+1] \cdot S'[k+1] + \beta \cdot H[k] \cdot S'[k]} \right|^2 \quad (15)$$

Minimizing (15) leads to $$\beta = \alpha \cdot \sum_{k}^{K} \frac{(H[k+1] - H[k]) \cdot}{(H^*[k+1] \cdot S'[k+1] - H^*[k] \cdot S'[k])} \quad (16)$$

Approximating $\alpha_{tx} \approx 1$ leads to $$\beta' = \sum_{k}^{K} \frac{(H[k+1] - H[k]) \cdot}{(H^*[k+1] \cdot S'[k+1] + H^*[k] \cdot S'[k])} \quad (17)$$

$$\alpha_{tx} = \sqrt{1 - \mathcal{J}^2\{\tilde{\beta}_{tx}\}} - j\frac{\Re\{\tilde{\beta}_{tx}\} \cdot \mathcal{J}\{\tilde{\beta}_{tx}\}}{\sqrt{1 - \mathcal{J}^2\{\tilde{\beta}_{tx}\}}} \quad (18)$$

$$\beta_{tx} = \alpha_{tx} \cdot \tilde{\beta}_{tx} \quad (19)$$

Expression (11) is generally applicable for transmitter quadrature imbalance characterization as the channel response of transferring the transmitter signal to the receiver is relatively flat. If the channel response is however strongly varying, expression (17) can be used instead.

The characterization equations derived for transmitter quadrature imbalance cannot be reused for the receiver because their input signals are fundamentally different. At the input of the transmitter, a known multi-tone BPSK symbol is provided of which the data-carriers are symmetrically distributed. The signal presented to the receiver, however, is distorted by transmitter non-idealities and the channel. Moreover, as the transmitter and receiver operate on different frequencies, the spectral content of this distorted signal is, in view of the receiver, no longer symmetrically distributed meaning that there is no spectral content at the image frequencies of the data-carriers.

The receiver quadrature imbalance characterization is initiated by FIG. 3: when G (29) is the signal presented at the receiver input and $\bar{d}$ the location of non-zero data-carriers in G (29), then at the corresponding image locations $\bar{i}_d$, $G[\bar{i}_d]=0$. Therefore, and based on (4), $$R = \alpha_{rx} \cdot G + \beta_{rx} \cdot G^*_m \quad (20)$$

can be decomposed in $$R[\bar{d}] = \alpha_{rx} \cdot G[\bar{d}]$$

$$R[\bar{i}_d] = \beta_{rx} \cdot G^*_m[\bar{i}_d] = \beta_{rx} \cdot G^*[\bar{d}] \quad (21)$$

These relations apply on any arbitrary signal G (29), as long as the above conditions are fulfilled. In given system, G (29) is related to s (23) in (4) such that, $$G[\bar{d}] = (\alpha_{tx} \cdot S[\bar{k}] + \beta_{tx} \cdot S^*_m[\bar{k}]) \cdot CH[\bar{k}] \quad (22)$$

where $\bar{k}$ are locations of non-zero data-carriers in the signal S (23) and $\bar{d}$ the corresponding data locations in the signal R (28). When $\bar{f}$ represents the frequency offset between up- and down-conversion, then $\bar{d}=\bar{k}+\bar{f}$. For $\bar{n}$ values of $\bar{k}$, the receiver quadrature imbalance parameters can be calculated as:

$$\alpha_{rx} = \frac{1}{n}\sum_{\bar{k}}^{\bar{n}} \frac{R[\bar{d}]}{G[\bar{d}]} = \frac{1}{n}\sum_{\bar{k}}^{\bar{n}} \frac{R[\bar{d}]}{(\alpha_{tx} \cdot S[\bar{k}] + \beta_{tx} \cdot S^*_m[\bar{k}]) \cdot CH[\bar{k}]} \quad (23)$$

$$\beta_{rx} = \frac{1}{n}\sum_{\bar{k}}^{\bar{n}} \frac{R[\bar{i}_d]}{G^*[\bar{d}]} = \frac{1}{n}\sum_{\bar{k}}^{\bar{n}} \frac{R[\bar{i}_d]}{\begin{pmatrix} \alpha^*_{tx} \cdot S^*[\bar{k}] + \\ \beta^*_{tx} \cdot S_m[\bar{k}] \end{pmatrix} \cdot CH^*[\bar{k}]} \quad (24)$$

Note that an increased value of n improves the characterization accuracy.

As described earlier, the carrier feedthrough is caused by a collection of imperfections along the transmitter path. For characterization, the origin and contribution of each of these imperfections is irrelevant; their global effect (the unwanted tone at the carrier frequency) counts. The characterization proposed here theoretically bundles the various imperfections to one imperfection, namely a complex dc-offset $\delta_{CFT}$ in the base-band signal S (23).

In FIG. 3, the unwanted carrier tone represents at $Ri[\bar{c}]$ (27), where $\bar{c}$ indicates the location of the dc-carrier. Based on $Ri[\bar{c}]$ (27), the equivalent base-band complex dc-offset $\delta_{CFT}$ is calculated from (5), $$Ri[\bar{c}] = (\alpha_{tx} \cdot (S[\bar{c}] + \delta_{CFT}) + \beta_{tx} \cdot (S[\bar{c}] + \delta_{CFT})^*) \cdot CH[\bar{c}] \quad (25)$$

where the following can be extracted, $$\delta_{CFT} = \frac{\alpha^*_{tx} \cdot \frac{Ri[\bar{c}]}{CH[\bar{c}]} - \beta_{tx} \cdot \left(\frac{Ri[\bar{c}]}{CH[\bar{c}]}\right)^*}{|\alpha_{tx}|^2 - |\beta_{tx}|^2} - S[\bar{c}] \quad (26)$$

As the training symbol generally does not contain dc, $S[\bar{c}]=0$.

Figure 4:
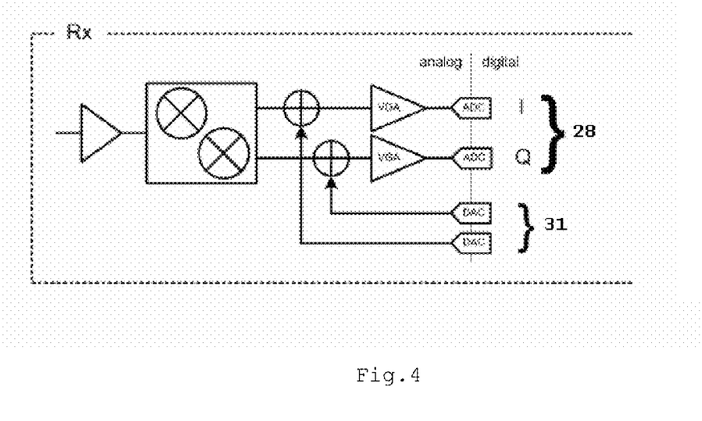
FIG. 4 shows a receiver architecture.

The major problem with receiver dc-offset due to self-mixing is that the dc-offset is present at the mixer output and thus before the variable gain (VGA) stages; it may severely limit the gain and linearity performances of the receiver. The only option to avoid this performance degradation is to remove the dc-offset at that specific location. Inserting a high-pass filter would be a solution, but not feasible in terms of implementation. The solution proposed here and illustrated in FIG. 4 is to add a—digitally generated—complex dc-offset $\delta_{comp}$ (31) to compensate for the receiver dc-offset. The calibration challenge relies in efficiently finding the optimal $\delta_{comp}$ (31) that eliminates the remaining dc-offset at the input of the VGA.

The suggested calibration method applies on any arbitrary signal, but requires (at least) two consequent signal-captures. During the first signal capture, no digital offset will be applied such that the initial dc-offset equals $R[\bar{c}]=dc_i$, where $\bar{c}$ indicates the location of the dc-carrier. During the second signal capture, an arbitrary offset $\delta_{comp}$ (31) will be applied and the captured dc-offset equals $R[\bar{c}]=dc_e$.

Generally, it can be stated that $$dc_e = dc_i + \delta_{comp} \cdot \overline{M_L} \cdot e^{j\overline{\phi_L}} \quad (27)$$

where $\overline{M_L}$ and $\overline{\phi_L}$ respectively represent the magnitude gain and the phase rotation of the DAC-ADC loop; they are calculated from $dc_e$ and $dc_e$ as:

$$\overline{M_L} \cdot e^{j\overline{\phi_L}} = \frac{dc_e - dc_i}{\delta_{comp}} \quad (28)$$

such that the complex dc-offset compensation in the digital domain can be calculated:

$$0 = dc_i + \delta_{comp} \cdot \overline{M_L} \cdot e^{j\overline{\phi_L}} \quad (29)$$

$$\delta_{comp} = -\frac{dc_i}{\overline{M_L} \cdot e^{j\overline{\phi_L}}}$$

Once the transmitter and the receiver non-idealities are characterized, this information is used to optimize the performance of the transmitter and receiver system. This optimization is achieved by digital pre- and post-compensation of the base-band time domain signal in the transmitter and receiver respectively.

Applying this compensation in the digital domain enables stable and easy implementation without the need for additional analog circuitry whereas applying it in the time domain enables compensation of any data-stream, independent of its mode or modulation scheme.

Pre-compensation enhances the signal quality at the RF transmitter output by manipulating its base-band input signal inversely to the non-ideal transmitter characteristics. Now, this inverse relation will be determined for quadrature imbalance and for carrier feedthrough.

Figure 5:
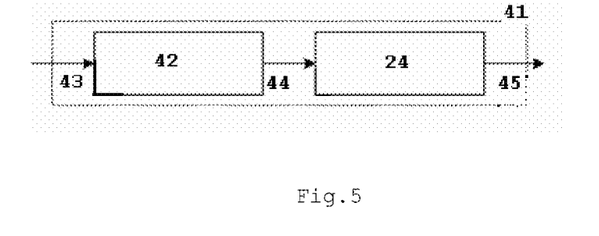
FIG. 5 shows a block diagram of a transmitter containing pre-compensation.

FIG. 5 shows the block diagram of a transmitter (41) containing pre-compensation for its quadrature imbalance (42); $x_{tx}$ (43) is the incoming base-band data-stream, $y_{tx}$ (44) the pre-compensated base-band signal and $z_{tx}$ (45) the (idealized) transmitter output.

Based on (1), the quadrature imbalance expressed in a time-domain signal equals $$z_{tx}=\alpha_{tx} \cdot y_{tx}+\beta_{tx} \cdot y^*_{tx} \quad (30)$$

The pre-compensation aims for $y_{tx}$ (44) such that $x_{tx}=z_{tx}$. Therefore the pre-compensation relation can be extracted as:

$$y_{tx} = \frac{\alpha^*_{tx} \cdot x_{tx} - \beta_{tx} \cdot x^*_{tx}}{|\alpha_{tx}|^2 - |\beta_{tx}|^2} \quad (31)$$

Figure 6:
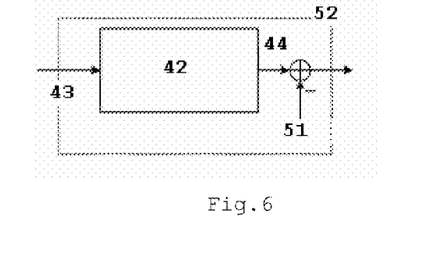
FIG. 6 shows a transmitter pre-compensation architecture.

To compensate for carrier feedthrough, $\delta_{CFT}$ (51) achieved from carrier feedthrough characterization is subtracted after quadrature imbalance pre-compensation (42). The final pre-compensation architecture (52) is thus shown in FIG. 6.

Figure 7:
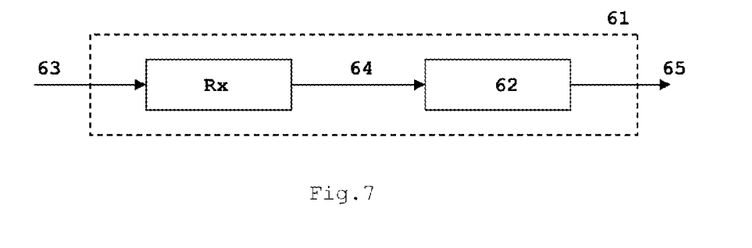
FIG. 7 shows a block diagram of a receiver containing post-compensation.

Post-compensation enhances the signal quality at the base-band receiver output by manipulating this signal inversely to the non-ideal receiver characteristics. Now, this inverse relation will be determined. FIG. 7 shows the block diagram of a receiver (61) containing post-compensation for its quadrature imbalance (62); $x_{rx}$ (63) is the incoming RF signal, $y_{rx}$ (64) the down-converted base-band signal and $z_{rx}$ (65) the idealized (by means of post-compensation) receiver output.

Based on (1), the quadrature imbalance expressed in a time-domain signal equals $$y_{rx}=\alpha_{rx} \cdot x_{rx}+\beta_{rx} \cdot x^*_{rx} \quad (32)$$

Figure 8:
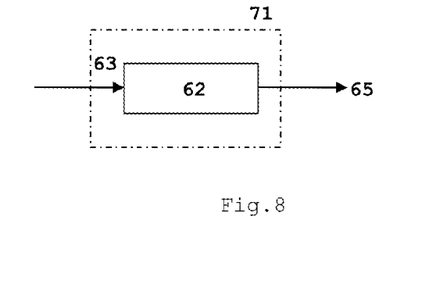
FIG. 8 shows a receiver post-compensation architecture.

The post-compensation targets to remove the imperfections due to the non-ideal receiver such that $x_{rx}=z_{rx}$. Therefore the post-compensation relation can be extracted as:

$$z_{rx} = \frac{\alpha^*_{rx} \cdot y_{rx} - \beta_{rx} \cdot y^*_{rx}}{|\alpha_{rx}|^2 - |\beta_{rx}|^2} \quad (33)$$

such that the final post-compensation architecture (71) looks like FIG. 8.

As (31) and (33) are similar, the same implementation in the digital domain can be used.

Figure 9:
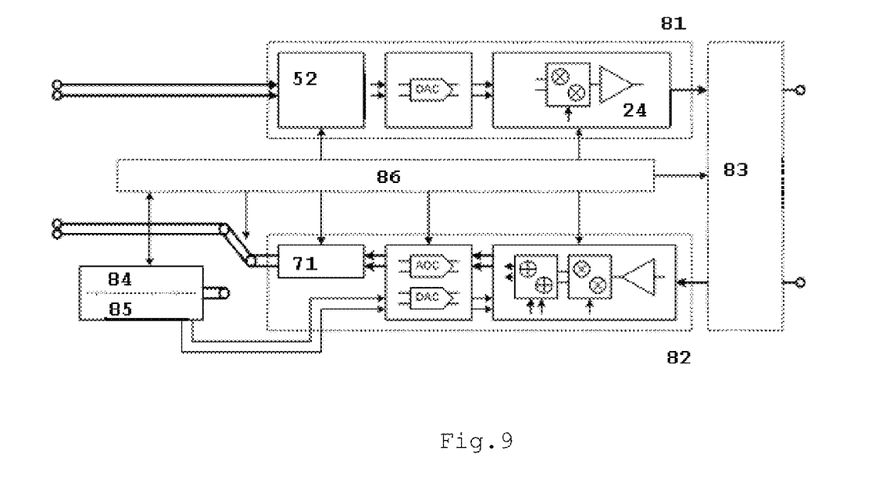
FIG. 9 shows a transceiver architecture enabling calibration.

The block diagram of a transceiver enabling the suggested calibration is shown in FIG. 9. This architecture contains the following blocks:

transmitter (81) and receiver (82): conventional direct-conversion modules, not/partly/completely implemented of the same chip and able to operate simultaneous (such as FDD systems) on a different frequency.

antenna interface (83): apart from its traditional purpose, it could embed an active and configurable coupling between the transmitter output and the receiver input. This coupling is not mandatory; 'parasitic' coupling is generally sufficient for the targeted calibration.

Decomposition (84)/characterization (85): digital block that extracts the 'ideal receiver' signal and applies the characterization algorithms as previously described.

Control (86): masters the complete calibration; configuration of the system, generation of the up- and down-conversion frequency and transferring the characterized parameters to the compensation blocks.

As, from an analog point of view, additional hardware/circuitry can be avoided, any transceiver as described in the previous can be calibrated in given architecture. Note that the frequency synthesizers have been considered to be part of the control unit (86) rather than the transceiver. In multi-mode transceivers, these synthesizers will be considered part of the transceiver.

The characterization is suggested to be performed at discrete time-instances, namely at system start-up, at mode-handover and/or at system defined time instances, and updates the compensation parameters. Additional run-time calibration, mainly tackling environmental conditions, can still be applied.

As the calibration operates on a training symbol present in a standard compliant data-package, the calibration can be scheduled such that the system remains operational: the transmitted data-package is simply coupled to the receiver configured in calibration mode. Thus, although effective data is transmitted, both the transmitter and receiver non-idealities are calibrated.

Given calibration schedule might, however, degrade optimal system performance for a fraction of time. When the system is calibrated at start-up or mode-handover, no recent information on the transmitter non-idealities is available; non-ideally compensated data might thus be transmitted. Potential alternative calibration schedules at start-up and mode-handover will be mentioned next.

One good calibration schedule at mode-handover in MIMO systems is to gradually calibrate and switch the different transceivers to the new mode while keeping the remaining ones operational in the original mode. In this way, the system remains operational and the performance optimal.

At start-up, sufficient time is available for setting-up the system. A—negligible—fraction of this time could be dedicated to calibrate the transceiver: transferring a single training symbol over the transmitter-receiver loop is sufficient. In case of MIMO systems, the calibration of all transceivers is scheduled in parallel.

The characterization proposed in this illustration of a direct conversion transceiver is performed on one single training symbol. As both the receiver quadrature imbalance and the carrier feedthrough characterization uses results obtained in the transmitter quadrature characterization, they are preferably scheduled after the latter. Receiver dc-offset characterization can be scheduled independently from the others. Once the corresponding non-idealities are characterized, they can directly update the parameters pre-/post-compensating the following symbols.

One embodiment relates to a system for determining transmitter and receiver non-ideality characteristics introduced on a signal by a transceiver. The transceiver comprises a first up-conversion transmitter and a first down-conversion receiver. The system comprises a generating unit configured to generate a signal comprising at least one known training symbol as part of a data package to be transmitted. The system further comprises a up-converting unit configured to up-convert with a first frequency the signal to a first signal in the first transmitter. The system further comprises a transferring unit configured to transfer the first signal from the first transmitter to the first receiver. The system further comprises a down-converting unit configured to down-convert with a second frequency the transferred first signal to a second signal in the first receiver, the second frequency being different from but linked to the first frequency. The system further comprises a detecting unit configured to detect at least one of the training symbols in the second signal. The system further comprises a separating unit configured to separate, in the frequency domain, at least one of the components of at least one of the detected training symbols for determining the non-ideality characteristics.

In one embodiment, the above system may further comprises a pre-compensating unit configured to digitally pre-compensate signals provided to at least one of the transmitters. The system may further comprises a post-compensating unit configured to digitally post-compensate signals coming from at least one of the receivers. The pre- and post-compensation are performed based at least in part upon non-ideality characteristics determined by the separating unit.

In one embodiment, the system may further comprises a selecting unit configured to select at a predetermined time instance at least one transmitter/receiver pair. The system may further comprises a calibrating unit configured to calibrate the pair based at least in part upon the determined non-ideality characteristics.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. A method of determining transmitter and receiver non-ideality characteristics introduced on a signal by a transceiver, the transceiver comprising a first up-conversion transmitter and a first down-conversion receiver, the method comprising:
   a) generating a signal comprising at least one training symbol as part of a data package to be transmitted;
   b) up-converting with a first frequency the signal to a first signal in the first up-conversion transmitter;
   c) transferring the data package comprising the first signal from the first up-conversion transmitter to the first down-conversion receiver;
   d) down-converting with a second frequency the transferred first signal to a second signal in the first down-conversion receiver, the second frequency being different from the first frequency to allow separation of a first spectral component caused by an up-conversion transmitter non-ideality from a second spectral component caused by a down-conversion receiver non-ideality;
   e) detecting the at least one training symbol in the second signal;
   f) separating, in the frequency domain, the first spectral component of the at least one detected training symbol for determining at least one transmitter non-ideality characteristic and separating the second spectral component of the at least one detected training symbol for determining at least one receiver non-ideality characteristic;
   wherein the method is performed while the transceiver remains operational for sending and/or receiving data.

2. The method according to claim 1, wherein the transceiver comprises a plurality of transmitters and receivers, the method further comprising selecting at least one transmitter/receiver pair, the pair forming the first transmitter and the first receiver.

3. The method according to claim 1, wherein the method is performed at a predetermined time instance.

4. The method according to claim 3, wherein the predetermined time instance is one of the following: at start-up, at mode handover, and at a user-defined instance.

5. The method according to claim 1, wherein the process f) comprises determining transmitter quadrature imbalance characteristics by comparing the at least one separated component with the at least one training symbol.

6. The method according to claim 5, wherein the process f) further comprises determining receiver quadrature imbalance characteristics by comparing the at least one separated component with the at least one training symbol.

7. The method according to claim 5, wherein the process f) further comprises determining carrier feed-through characteristics by comparing the at least one separated component with the at least one training symbol.

8. The method according to claim 5, wherein the process f) comprises determining the receiver DC-offset by applying a compensation DC.

9. The method according to claim 1, wherein the process c) of transferring the first signal from the first up-conversion transmitter to the first-down-conversion receiver exploits parasitic coupling between the first transmitter and the first receiver.

10. A method of operating a transceiver comprising at least one up-conversion transmitter and at least one down-conversion receiver, the method comprising digitally pre-compensating signals provided to at least one of the transmitters and digitally post-compensating signals coming from at least one of the receivers, the pre- and post-compensation being performed based at least in part upon non-ideality characteristics determined by the method according to claim 1.

11. The method according to claim 10, wherein the process f) comprises:
    determining transmitter quadrature imbalance characteristics by comparing at least one separated component with the at least one training symbol; and
    determining carrier feed-through characteristics by comparing at least one separated component with the at least one training symbol,
    and wherein the process of digitally pre-compensating signals comprises:
    a first signal manipulation of the signals according to the transmitter quadrature imbalance characteristics determined; and
    subsequent to the first signal manipulation, a second signal manipulation of the signals according to the carrier feed-through characteristics determined.

12. The method according to claim 10, wherein the process f) comprises determining receiver quadrature imbalance characteristics by comparing at least one separated component with the at least one training symbol, wherein the process of digitally post-compensating signals comprises a signal manipulation according to the receiver quadrature imbalance characteristics determined.

13. The method according to claim 10, further comprising:
    selecting at a predetermined time instance at least one transmitter/receiver pair;
    calibrating the pair based at least in part upon the determined non-ideality characteristics.

14. The method according to claim 13, further comprising pre- and/or post-compensating the signals according to the calibrated characteristics.

15. The method according to claim 10, wherein the process f) comprises:
    determining transmitter quadrature imbalance characteristics by comparing at least one separated component with the at least one training symbol; and
    determining carrier feed-through characteristics by comparing at least one separated component with the at least one training symbol,
    and wherein the process of digitally pre-compensating signals comprises:
    pre-compensating for determined transmitter quadrature imbalance characteristics; and
    pre-compensating for determined carrier feed-through characteristics.

16. The method according to claim 15, wherein the process f) comprises determining receiver quadrature imbalance characteristics by comparing at least one separated component with the at least one training symbol, wherein the process of digitally post-compensating signals comprises post-compensating for determined receiver quadrature imbalance characteristics.

17. The method according to claim 1, wherein the first frequency and the second frequency are chosen such that the separating of the at least one component is facilitated.

18. The method according to claim 1, wherein the data package is standard compliant.

19. The method according to claim 1, wherein the signal includes a single training symbol.

20. A system for determining transmitter and receiver non-ideality characteristics introduced on a signal by a transceiver, the transceiver comprising a first up-conversion transmitter and a first down-conversion receiver, the system comprising:
    means for generating a signal comprising at least one training symbol as part of a data package to be transmitted;
    means for up-converting with a first frequency the signal to a first signal in the first up-conversion transmitter;
    means for transferring the data package comprising the first signal from the up-conversion transmitter to the first down-conversion receiver;
    means for down-converting with a second frequency the transferred first signal to a second signal in the first down-conversion receiver, the second frequency being different from the first frequency to allow separation of a first spectral component caused by an up-conversion transmitter non-ideality from a second spectral component caused by a down-conversion receiver non-ideality;
    means for detecting the at least one training symbol in the second signal; and
    means for separating, in the frequency domain, the first spectral component of the at least one detected training symbol for determining the at least one transmitter non-ideality characteristic and means for separating the second spectral component of the at least one detected training symbol for determining at least one receiver non-ideality characteristic,
    wherein the system determines the at least one transmitter non-ideality characteristic or at least one receiver non-ideality characteristic while the transceiver remains operational for sending and/or receiving data.

21. The system according to claim 20, further comprising:
    means for digitally pre-compensating signals provided to at least one of the transmitters; and
    means for digitally post-compensating signals coming from at least one of the receivers, wherein the pre- and post-compensation are performed based at least in part on non-ideality characteristics determined by the separating means.

22. The system according to claim 20, wherein the means for up-converting comprises at least one transmitter and the means for down-converting comprises at least one receiver, the system further comprising:

means for selecting at a predetermined time instance at least one transmitter/receiver pair; and means for calibrating the pair based at least in part upon the determined non-ideality characteristics.

23. A system for determining transmitter and receiver non-ideality characteristics introduced on a signal by a transceiver, the transceiver comprising a first an up-conversion transmitter and a first down-conversion receiver, the system comprising:

a generating unit configured to generate a signal comprising at least one training symbol as part of a data package to be transmitted;

an up-converting unit configured to up-convert with a first frequency the signal to a first signal in the first up-conversion transmitter;

a transferring unit configured to transfer the data package comprising the first signal from the first up-conversion transmitter to the first down-conversion receiver;

a down-converting unit configured to down-convert with a second frequency the transferred first signal to a second signal in the first down-conversion receiver, the second frequency being different from the first frequency to allow separation of a first spectral component caused by an up-conversion transmitter non-ideality from a second spectral component caused by a down-conversion receiver non-ideality;

a detecting unit configured to detect the at least one training symbol in the second signal; and a separating unit configured to separate, in the frequency domain, the first spectral component of the at least one detected training symbol for determining the at least one transmitter non-ideality characteristic and separate the second spectral component of the at least one detected training symbol for determining the at least one receiver non-ideality characteristic;

wherein the system determines at least one transmitter non-ideality characteristic or at least one receiver non-ideality characteristics while the transceiver remains operational for sending and/or receiving data.

24. The system according to claim 23, further comprising:

a pre-compensating unit configured to digitally pre-compensate signals provided to at least one of the transmitters; and a post-compensating unit configured to digitally post-compensate signals coming from at least one of the receivers, wherein the pre- and post-compensation are performed based at least in part on non-ideality characteristics determined by the separating unit.

25. The system according to claim 23, wherein the up-converting unit comprises at least one transmitter and the down-converting unit comprises at least one receiver, the system further comprising:

a selecting unit configured to select at a predetermined time instance at least one transmitter/receiver pair; and a calibrating unit configured to calibrate the pair based at least in part upon the determined non-ideality characteristics.

* * * * *